(12) United States Patent
Deshmukh et al.

(10) Patent No.: US 11,882,601 B2
(45) Date of Patent: Jan. 23, 2024

(54) DYNAMIC CONTROL OF DATA BURSTS

(71) Applicant: Hewlett Packard Enterprise Development LP, Houston, TX (US)

(72) Inventors: Amogh Guruprasad Deshmukh, Santa Clara, CA (US); Abhiruchi Dakshinkar, Santa Clara, CA (US); Eldad Perahia, Park City, UT (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 323 days.

(21) Appl. No.: 17/475,663

(22) Filed: Sep. 15, 2021

(65) Prior Publication Data

US 2023/0082306 A1    Mar. 16, 2023

(51) Int. Cl.
*H04W 24/10* (2009.01)
*H04W 74/08* (2009.01)
*H04L 1/20* (2006.01)
*H04L 1/00* (2006.01)
*H04W 72/542* (2023.01)

(52) U.S. Cl.
CPC ....... *H04W 74/0816* (2013.01); *H04L 1/0003* (2013.01); *H04L 1/203* (2013.01); *H04W 24/10* (2013.01); *H04W 72/542* (2023.01)

(58) Field of Classification Search
CPC ........... H04W 74/0816; H04W 72/542; H04W 24/10; H04L 1/003; H04L 1/203
USPC ......................................................... 370/329
See application file for complete search history.

(56) References Cited

U.S. PATENT DOCUMENTS

| | | | |
|---|---|---|---|
| 8,233,462 B2 | 7/2012 | Walton et al. | |
| 8,483,105 B2 | 7/2013 | Nanda et al. | |
| 8,842,657 B2 | 9/2014 | Walton et al. | |
| 10,342,047 B2 | 7/2019 | Yang et al. | |
| 10,433,337 B2 * | 10/2019 | Choi | H04W 72/542 |
| 2015/0296507 A1 | 10/2015 | Kneckt et al. | |
| 2016/0295580 A1 | 10/2016 | Katar et al. | |
| 2018/0160459 A1 | 6/2018 | Cavalcante et al. | |
| 2018/0324849 A1 | 11/2018 | Asterjadhi et al. | |
| 2020/0288523 A1 * | 9/2020 | Patil | H04W 80/02 |
| 2022/0232426 A1 * | 7/2022 | Hosseini | H04W 74/0808 |

* cited by examiner

*Primary Examiner* — Christopher R Crompton
(74) *Attorney, Agent, or Firm* — Hewlett Packard Enterprise Patent Department

(57) ABSTRACT

Examples of techniques for dynamically controlling data bursts are described. In an example, an access point (AP) monitors a link quality between the AP and a client device associated with the AP. The AP determines a channel occupancy of a channel in which the AP is configured to operate. In response to determining that the channel occupancy is less than a channel busy threshold, the AP modifies a burst duration for traffic flow between the AP and the client device based on the link quality. The AP communicates with the client device using the channel for the modified burst duration.

20 Claims, 7 Drawing Sheets

DYNAMIC CONTROL OF DATA BURSTS

BACKGROUND

A computer network includes a variety of network devices, such as access points, controllers, gateways, switches, etc., which perform different networking operations, such as network access, authentication, and routing network traffic to provide connectivity. A Wireless Local Area Network (WLAN) may include a plurality of Access Points (APs), as elements of the WLAN. These APs may be deployed in a network.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
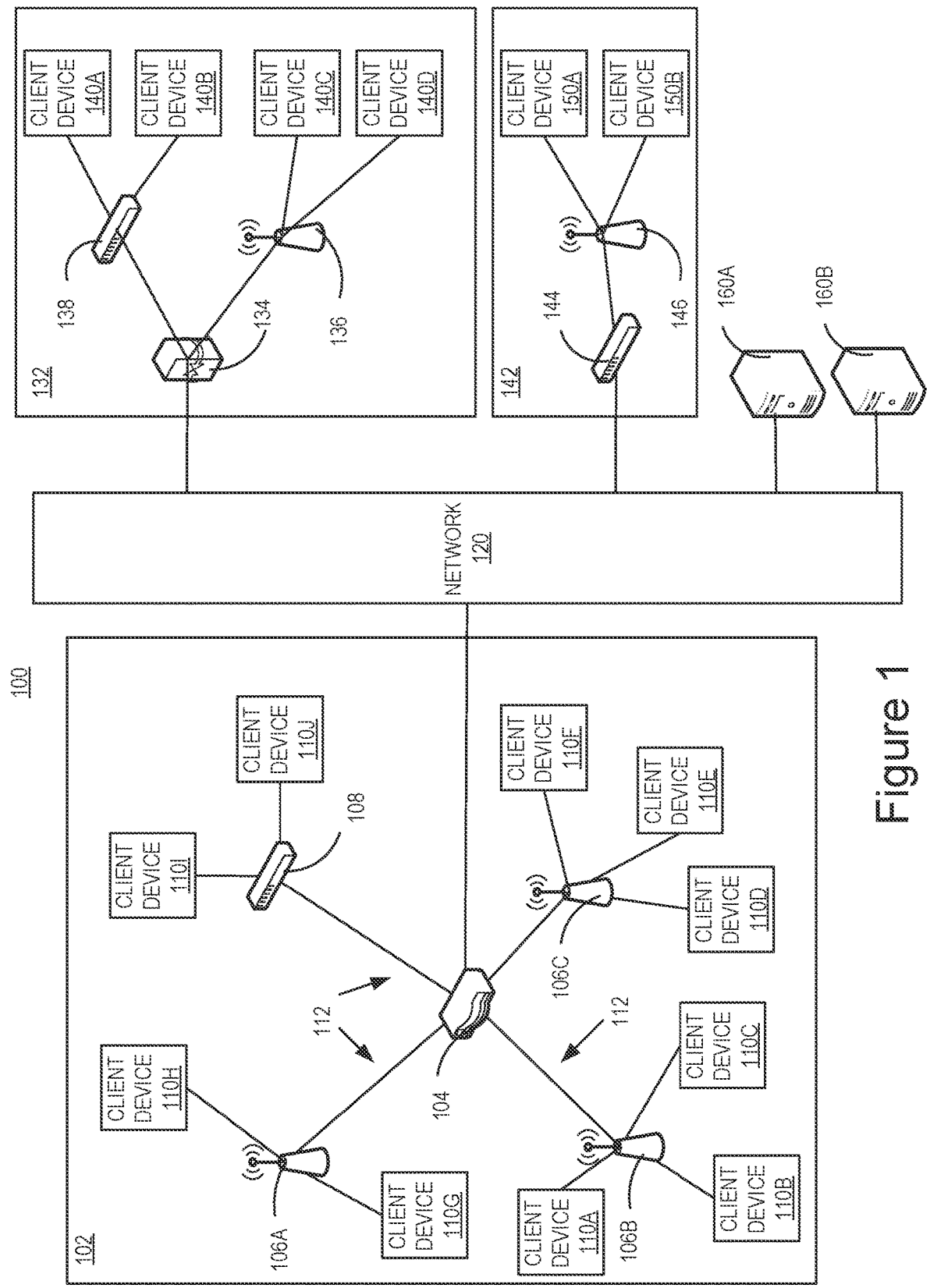
FIG. 1 illustrates an example network configuration that may be implemented for an organization, such as a business, educational institution, governmental entity, healthcare facility or other organization in which the embodiments described herein may be implemented.

The figures are not exhaustive and do not limit the present disclosure to the precise form disclosed.

DETAILED DESCRIPTION

Wireless devices, such as laptops, smartphones, APs, etc., functioning using wireless network protocols based on the Institute of Electrical and Electronics Engineers (IEEE) 802.11 family of standards use air as a transmission medium and share access to the air medium. The wireless devices generally operate in a half-duplex mode where the wireless devices may transmit and receive data but not simultaneously.

The IEEE 802.11 specifications (including Wi-Fi) may implement media access control (MAC) techniques, such as Point Coordination Function (PCF) or Distributed Coordination Function (DCF), for wireless communication using Wireless Local Area Networks (WLANs). MAC deals with addressing, assigning multiplex WLAN channels to different users and avoiding collisions. MAC is a sub-layer in the data link layer (layer 2) of the Open Systems Interconnection (OSI) model and a component of the link layer of the Transmission Control Protocol/Internet Protocol (TCP/IP) model. Within the data link layer, the MAC sublayer provides flow control and shared access of the transmission medium. The 802.11 standards provide several distinct radio frequency ranges for use in Wi-Fi communications, such as 2.4 GHz, 3.6 GHz, 5 GHz bands, 6 GHz. Each frequency range is divided into multiple channels. In an example, the channels may have a fixed spacing, such as 5 MHz, within a frequency range.

In an example, MAC techniques may employ a contention-based channel access mechanism such as, carrier-sense multiple access with collision avoidance (CSMA/CA). In CSMA/CA, a wireless device such as an AP or a client device transmits data after detecting that a shared channel is clear. Thus, the wireless device verifies the absence of other traffic before transmitting on the shared channel. A wireless device that is ready to transmit data may first determine whether another transmission is in progress before initiating a transmission using CSMA. That is, the wireless device tries to detect the presence of a carrier signal from another wireless device before attempting to transmit. If the carrier signal from another wireless device is detected, the wireless device waits for the transmission that is in progress to end before initiating its own transmission. Using the CSMA, multiple wireless devices may, in turn, share the same channel for sending and receiving data.

Consider that an AP intends to send four frames, F1, F2, F3, and F4 over a shared channel. For sending F1, the AP may contend for the channel for a time equal to DCF Inter-Frame Space (DIFS) or PCF Inter-Frame Space (PIFS). The AP waits for the DIFS or the PIFS, and if no other AP or client is transmitting for the DIFS or the PIFS, the AP gains access of the channel After the frame is sent, the AP waits for a time equal to a Short Inter-Frame Space (SIFS) for an acknowledgment response of the transmitted frame. The frames F2, F3, and F4 may be transmitted in the similar manner as described with reference to the frame F1. Thus, for transmitting each frame, the PIFS or the DIFS is consumed for contention resulting in loss of airtime for the AP.

Frame bursting is a data transmission technique in communication networks used at the data link layer of the OSI model or the link layer of the TCP/IP model to increase the rate of transmission of frames and thereby benefit from higher throughput. Frame bursting allows the transmitter to send a series of frames in succession without relinquishing control of the transmission medium. In some examples, a set of smaller frames may be concatenated (frame aggregation), to form a large frame that is transmitted at one go. As discussed above, communication protocols for shared mediums are designed to relinquish control of the transmission medium and wait for a while after the transmission of a MAC frame in order to facilitate fair use of the transmission medium by multiple devices. Frame bursting allows for transmission of more data packets per time interval for one device at the cost of wait time for other devices in the network.

Frame bursting allows a wireless device, for example, an AP or a client device to transmit data continuously over a transmission medium for a fixed time period of contention-free channel access thereby reducing the wait time for contention. Continuous transmission of a series of frames by the wireless device may be referred to as burst transmission. Here, the sender and the receiver acquire the channel for a defined transmission time limit, while contending for transmission of the first frame. In frame bursting, a Transmission Opportunity (TXOP) is a bounded time interval in which the wireless devices are allowed to transfer a series of frames without waiting fora fixed duration, such as DIFS/PIFS for contention. The TXOP is defined by a start time and a maximum TXOP duration also called a TXOP limit.

In the above example, with frame bursting, the sender waits for a time period equal to the RFS duration or the DIFS for transmitting the first frame F1. After the acknowledgment for F1 has been received, the sender does not need to wait for PIFS/DIFS since the channel is already acquired by the sender for burst transmission. So, the sender waits for a time equal to SIFS before sending the subsequent frames. This can continue until the maximum TXOP duration is reached. Thus, in such burst transmissions, successive frames transmitted in a TXOP duration may be separated by SIFS.

As explained above, in frame bursting, an AP may transmit multiple SIFS separated Protocol Data Units (PDUs), such as frames, in a single TXOP to a client. Because delays from channel contention may be minimized due to frame bursting, efficiency of the AP may be improved. A time duration for which the burst transmission can occur in a single TXOP is referred to as a burst duration. Generally, the burst duration is predefined and fixed. Thus, fine tuning the burst duration may not be possible. When frame bursting is enabled for an AP, generally the AP may be configured to perform burst transmissions with its associated client devices. The AP may further attempt to provide equal airtime for all its associated client devices to which the AP performs burst transmissions. However, the requirements of different client devices may be diverse based on several factors, such as distance of a client device from the AP, the type of application traffic the client device is handling, device type of the client, different privileges of users of the client device, etc. Allowing frame bursting with equal airtime for all the associated client devices to which the AP bursts may not result in optimal network performance and throughput for the AP.

In an example, if one or more client devices have poor network coverage, such client devices may be subject to higher packet drops. In such a scenario, if frame bursting is enabled for an AP servicing those client devices, the packet drops may further increase and overall performance of the AP may degrade. Thus, on one hand while benefits of frame bursting may not be available, on the other hand, as a result of frame bursting by the AP, other APs in the network may have to wait for a longer durations contending for channel access and thereby loose airtime.

In another example, different applications may have different ways of buffering traffic at a receiver side. For example, latency-sensitive traffic including real time applications, such as online gaming applications, Voice over IP (VoIP) applications, etc., may buffer traffic at the receiving-end at higher rates as compared to best effort traffic, such as peer-to-peer and email applications. Hence, different applications with different traffic buffering patterns may be impacted by frame bursting differently. For example, an AP may be transmitting latency-sensitive traffic to a first client device and best-effort traffic to a second client device. If frame bursting is enabled for the AP, in a first TXOP, the AP may transmit the latency-sensitive traffic to the first client device using the channel for a first burst duration. Further, after the expiry of the first TXOP, the AP may transmit the best-effort traffic to the second client device in a second TXOP, using the channel for a second burst duration. As a result, during the second burst duration, the transmission of the latency-sensitive traffic having a higher priority over the best-effort traffic is paused thereby adversely affecting QoS parameters of the latency-sensitive traffic. Thus, allowing frame bursting for all traffic types and all client devices may result in an undesired loss of airtime for some client devices or APs while disabling frame bursting for applications with latency-sensitive traffic may result in higher latencies.

The present subject matter discloses example techniques for dynamically modifying the burst duration of traffic flow between an AP and a client device based on various network conditions, thereby optimizing the performance of the AP and the quality of experience (QoE) for the client device. In an example, different network conditions, such as, link quality between the AP and the client device, traffic flow information of the client device, bursting behavior of wireless devices in a WLAN environment, a type of a Virtual Access Point (VAP) to which a client device is associated, or channel occupancy are monitored, Based on variations in one or more of these network conditions, the burst duration may be increased or decreased for traffic flow between the client device and the AP. Thus, the burst duration may be regulated per client device based on the network conditions, Modification to the burst duration per client device depending on the network conditions allows the AP to customize burst transmission to each associated client device thereby improving network performance. This fine-tuned control of the burst duration for each client device allows to selectively increase burst duration for a client device while reducing the burst duration for another to achieve enhanced overall network performance. Further, the proposed techniques also allow modifying the burst duration differently for traffic of different access categories for one or more client devices thereby allowing customized control of burst transmission by the AP and/or the client devices.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106*a-c*. Switches 108 and wireless APs 106*a-c* provide network connectivity to various client devices 110*a-j*. Using a connection to a switch 108 or AP 106*a-c*, a client device 110*a-j* may access network resources, including other devices on the (primary site 102) network and the network 120.

Consider that the APs 106*a-c* form an Extended Service Set (ESS). An ESS includes one or more interconnected basic service sets (BSSs) and their associated LANs. Each BSS may include a single AP together with all wireless client devices creating a WLAN. Thus, in FIG. 1, the AP 106*a* and client devices 110*g-h* may form a BSS, the AP 106*b* and client devices 110*a-c* may form another BSS, and so on.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Within the primary site 102, a switch 108 is included as one example of a point of access to the network established in primary site 102 for wired client devices 110*i-j*. Client devices 110*i-j* may connect to the switch 108 and through the switch 108, may be able to access other devices within the network configuration 100. The client devices 110*i-j* may also be able to access the network 120, through the switch 108. The client devices 110*i-j* may communicate with the switch 108 over a wired connection 112. In the illustrated example, the switch 108 communicates with the controller 104 over a wired connection 112, though this connection may also be wireless.

Wireless APs 106*a-c* are included as another example of a point of access to the network established in primary site 102 for client devices 110*a-h*. The APs 106*a-c* may control network access of the client devices 110*a-h* and may authenticate the client devices 110*a-h* for connecting to the APs and through the APs, to other devices within the network configuration 100. Each of APs 106*a-c* may be a combination of hardware, software, and/or firmware that is configured to provide wireless network connectivity to wireless client devices 110*a-h*. In the illustrated example, APs 106*a-c* can be managed and configured by the controller 104. APs 106*a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these client devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
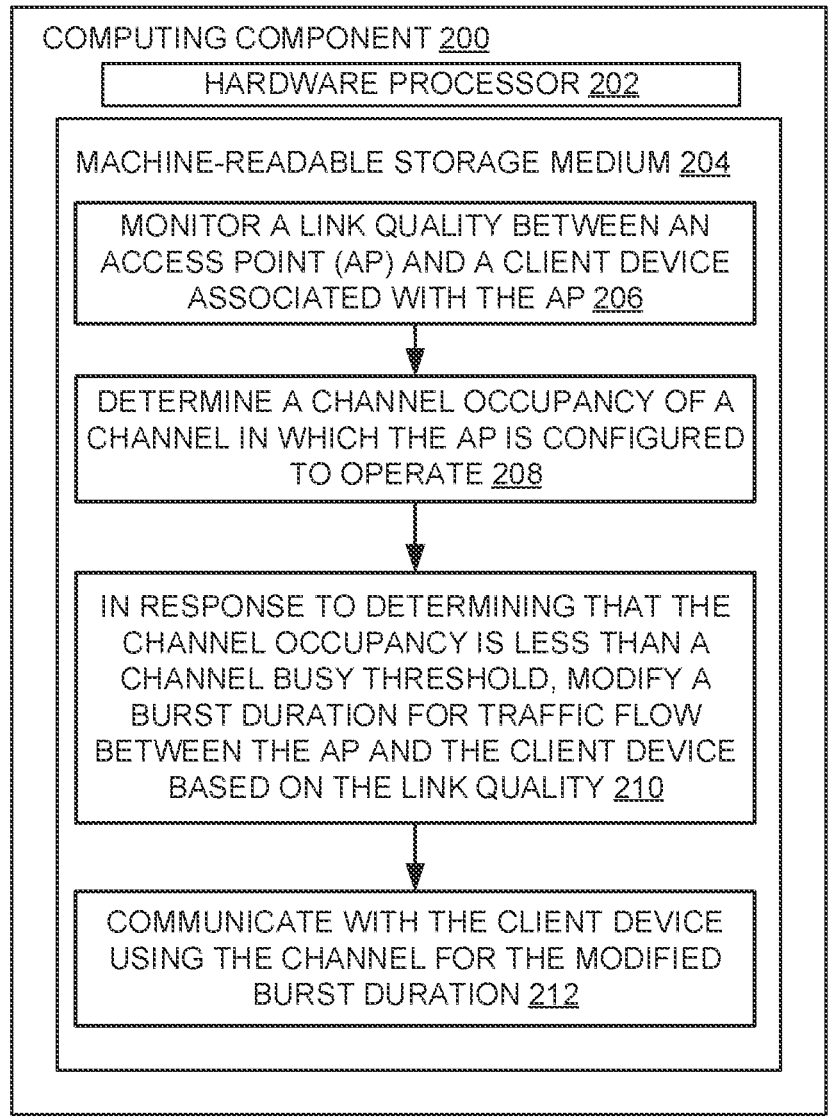
FIG. 2 is a block diagram of an example computing component for modifying burst duration, in accordance with an embodiment.

FIG. 2 is a block diagram of an example computing component 200 for modifying burst duration, in accordance with an embodiment. In an example, the computing component 200 may function as an AP. Thus, the computing device 200 is also referred to as an AP 200 in embodiments described herein. In another example, the computing component 200 may function as a client device, such as a computer, a smartphone, etc., connecting to the AP.

In the example implementation of FIG. 2, the computing component 200 includes a hardware processor 202 and a machine-readable storage medium 204. The hardware processor 202 may be one or more central processing units (CPUs), semiconductor-based microprocessors, and/or other hardware devices suitable for retrieval and execution of instructions stored in the machine-readable storage medium 204. The hardware processor 202 may fetch, decode, and execute instructions, such as instructions, to control processes or operations for modifying burst durations. As an alternative or in addition to retrieving and executing instructions, hardware processor 202 may include one or more electronic circuits that include electronic components for performing the functionality of one or more instructions, such as a field-programmable gate array (FPGA), application-specific integrated circuit (ASIC), or other electronic circuits.

A machine-readable storage medium, such as machine-readable storage medium 204, may be any electronic, magnetic, optical, or other physical storage device that contains or stores the executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions for performing operations for modifying burst durations.

Further, although the steps 206-212 shown in FIG. 2 are in an order, the shown order is not the only order in which the steps may be performed. Any step may be performed in any order, at any time, may be performed repeatedly, and/or may be performed by any suitable device or devices. The steps shown in FIG. 2 are also discussed in FIG. 4, at a differing level of detail.

In step 206, the hardware processor 202 may execute instructions stored in the machine-readable storage medium 204 to monitor a link quality between the AP 200 and a client device associated with the AP 200. The link quality may represent a signal-to-interference-plus-noise ratio (SINR) of the client device. In an example, the link quality may be determined based on Modulation and Coding Scheme (MCS) index values for the client device. MCS index values may represent a number of useful bits that can be transmitted per Resource Element (RE). A RE refers to a single unit of information made up of one symbol and one subcarrier. In an example, a higher MCS index value may suggest that more useful data may be transmitted and thus better link quality and vice-versa. In some examples, MCS index value may depend on packet error rate (PER) and a number of retries in transmitting a single packet.

In step 208, the hardware processor 202 may execute instructions stored in the machine-readable storage medium 204 to determine a channel occupancy of a channel in which the AP 200 is configured to operate. The channel, also called the operating channel, refers to a radio frequency assigned to the AP 200 for communication with client devices. The channel may represent the center frequency that the AP and a transceiver within the client radio may use. For example, in the 2.4 GHz frequency range, the channel 1 represents 2.412 GHz and channel 2 represents 2,417 GHz. The channel occupancy refers to availability of the channel for communication. In an example, the channel occupancy may depend on a percentage of time the channel is free. In an example, the AP may determine the channel occupancy using Clear Channel Assessment (CCA).

In response to determining that the channel occupancy is less than a channel busy threshold, the hardware processor 202 may execute instructions stored in the machine-readable storage medium 204 to modify a burst duration for traffic flow between the AP 200 and the client device based on the link quality, in step 210. The channel busy threshold may represent a percentage of time for which the channel is occupied for transmission. If the channel occupancy is higher than the channel busy threshold it indicates that the channel is busy and no modifications are carried out on the burst duration. This is because, modifying the burst duration while the channel is busy with ongoing transmission(s) may adversely affect the ongoing transmission(s). Thus, the burst duration is modified based on a network condition, such as, link quality, in response to determining that the channel occupancy is less than the channel busy threshold. In an example, modifying the burst duration may include increasing the burst duration in response to determining that the link quality has improved and decreasing the burst duration in response to determining that the link quality has deteriorated.

In step 212, the hardware processor 202 may execute instructions stored in the machine-readable storage medium 204 to communicate with the client device using the channel for the modified burst duration. In an example, communicating with the client device may include burst transmissions to the client device for the modified burst duration. In an example, communicating with the client device may include transmitting a plurality of physical layer protocol data unit (PPDUs) separated by SIFS from each other to the client device over the burst transmissions.

Figure 3A:
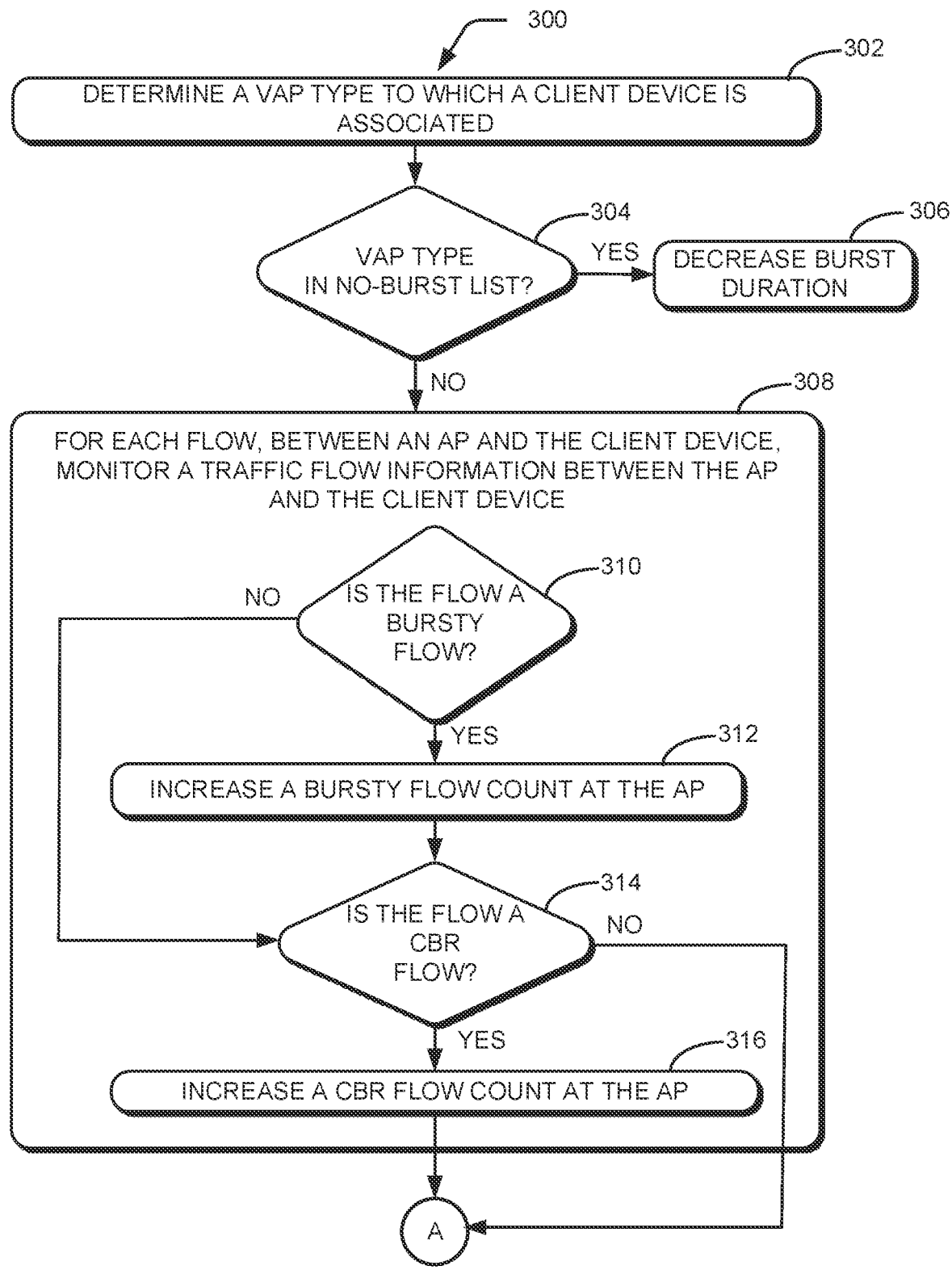
FIGS. 3A and 3B illustrate an example method for modifying burst duration, in accordance with an embodiment.
Figure 3B:
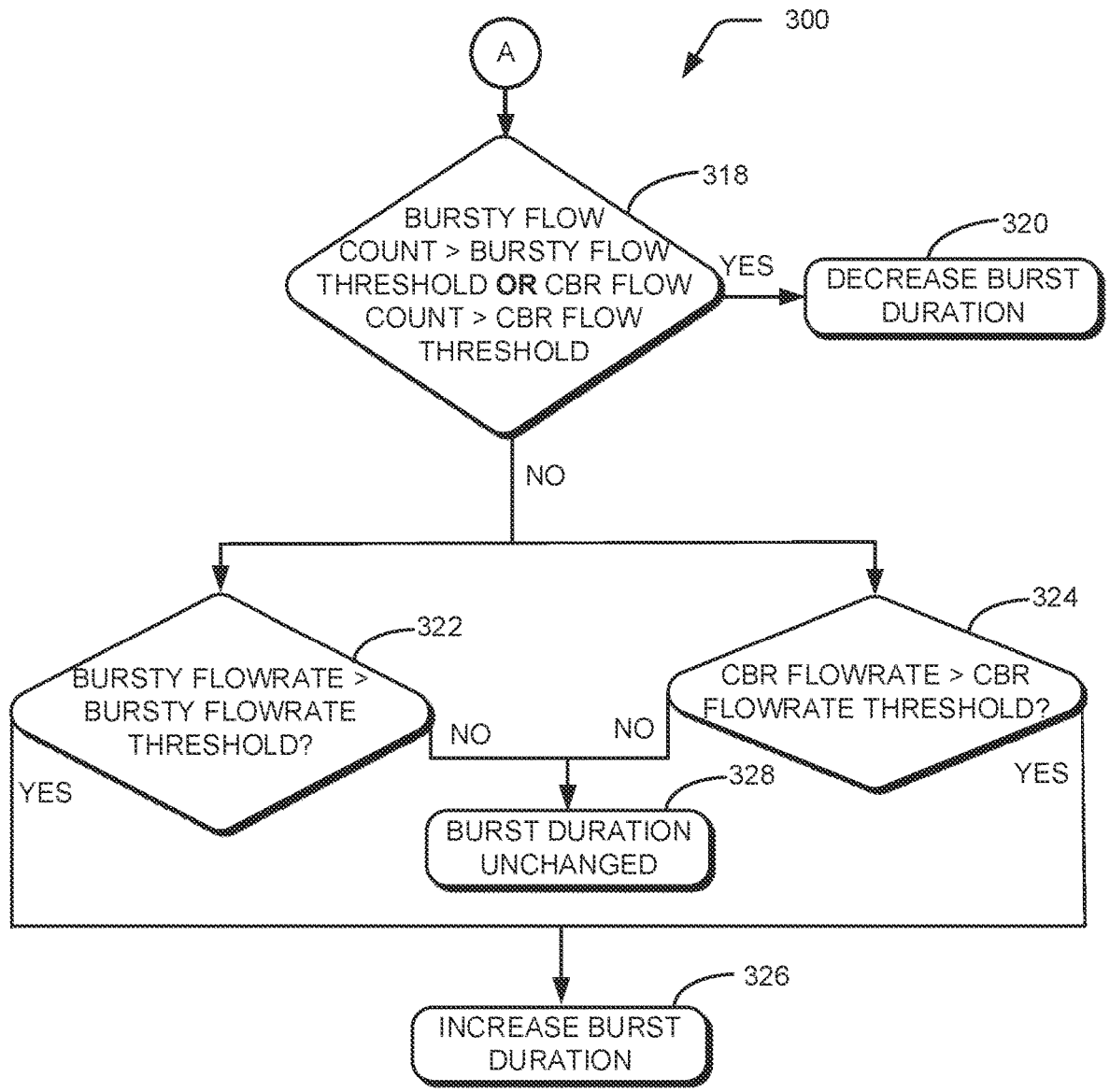

FIGS. 3A and 3B illustrate an example method 300 for modifying the burst duration in accordance with an embodiment. The method 300 may be executed by a network device, such as an AP. Although in the examples described herein, it is considered that the method 300 is implemented by an AP, however, steps of the method 300 may also be implemented by client devices, such as personal computers, laptops, smartphones, etc. The method 300 can be implemented by processing resource(s) or computing device(s) through any suitable hardware, a non-transitory machine-readable medium, or combination thereof. In an example, the method 300 may be performed by executing computer-readable instructions, which include instructions stored on a medium and executable by a processing resource, such as the hardware processor 202, of a computing component, such as the computing component 200. Further, although the steps shown in FIGS. 3A and 3B are in an order, the shown order is not the only order in which the steps may be performed. Any step may be performed in any order, at any time, may be performed repeatedly, and/or may be performed by any suitable device or devices.

In an example, a client device may send a probe request to an AP to associate with the AP. The probe request may include a Basic Service Set Identifier (BSSID) and a Service Set Identifier (SSID). The BSSID refers to a MAC address of the AP. The SSID refers to a natural language label that appears to users as a network name, such as name of a Wi-Fi network. In an example, the AP may host multiple virtual access points (VAPs). A VAP refers to a software-defined access point implemented within a physical Access Point (AP). Multiple VAPs may be implemented in a single physical AP and each VAP may function as an independent access point with its own unique SSID. In an example, a VAP implemented in the AP may receive the probe request and send a probe response. Further, the VAP may authenticate the client device and may associate with the client device.

Referring to FIG. 3A, at block 302, the AP may determine a type of the VAP. In an example, determining the type of the VAP may include determining the SSID of the VAP to which the client device is associated with. The type of the VAP represented by the SSID may indicate a designated use of the VAR For example, the VAP may present an SSID "Guest", which may indicate that guest users are expected to connect to the VAP and such a VAP may be identified as a "Guest" type VAR Alternatively, the VAP may present an SSID "Office" which may indicate that users connecting to a particular office network are expected to connect to the VAP and such a VAP may be identified as an "Office" type VAP. Thus, based on the SSIDs of the VAPs, a type of the VAP may be identified. In an example, the SSIDs of the VAPs may be included in a no-burst list or a burst-allow list. The no-burst list may include list of type of VAPs for which bursting may not be recommended. For example, the SSIDs "Guest" and "Home" may be included in the no-burst list. The burst-allow list may include list of VAPs for which bursting may be recommended. For example, the SSID "Office" may be included in the burst-allow list. The no-burst list or burst-allow list may be predefined by an administrator in the AP.

At block 304, the AP may check whether the type of the VAP is included in the no-burst list. In an example, if the SSID of the VAP is included in the no-burst list, the AP determines that the type of the VAP is included in the no-burst list. For example, if the AP determines that the SSID of the VAP is "Home" and the SSID "Home" is included in the no-burst list, then the AP may determine that the type of the VAP type is included in the no-burst list.

In response to determining that the type of the VAP is included in the no-burst list ('Yes' branch from block 304), the AP may decrease the burst duration for burst transmissions from the VAP to the client device, at block 306. In an example, the AP may modify Enhanced Distributed Channel Access (EDCA) parameters, such as TXOP limit, of the VAR to decrease the burst duration of burst transmissions from the VAR to the client device. Thus, burst transmission from the VAR in the no-burst list may be reduced to provide airtime fairness to other client devices or APs in the network. Airtime Fairness refers to equal access to airtime for every client device associated with an AP, regardless of client capability. In an example, prior to decreasing the burst duration, the AP may check a channel occupancy of an operating channel of the AP. The channel occupancy refers to an availability of the operating channel for communication. In an example, the channel occupancy may depend on a percentage of time the channel is free. In an example, in response to determining that the channel occupancy of the operating channel of the AP is below the channel busy threshold, the AP may decrease the TXOP limit to decrease the burst duration. In another example, in response to determining that the type of the VAP is included in the no-burst list ('Yes' branch from block 304), the AP may disable frame bursting for the VAR In response to determining that the type of the VAR is not included in the no-burst list (No' branch from block 304), the AP determines that the type of the VAR is included in a burst-allow list and therefore may perform further operations to check whether a burst duration of a client device associated with the VAP is to be modified. In response to determining that the type of the VAR is included in the burst-allow list, at block 308, the AP may monitor traffic flow information between the AP and the client device for each flow of network traffic between the AP and the client device. In an example, monitoring the traffic flow information may include analyzing flows of network traffic from each VAR included in the burst allow list to the client device.

Performing block 308 may include performing operations at blocks 310 to 316. Block 308 may be repeated for each flow of network traffic from the AP to the client device. At block 310, the AP may check whether a flow from the AP to the client device is a bursty flow. The bursty flow refers to a flow of network traffic from the AP to the client device for which frame bursting may be recommended. A flow may be determined to be a bursty flow based on at least one of a deep packet inspection (DPI) or a predefined application priority list. In an example, the AP may employ DPI to analyse the flow and identify an access category of the packets in the flow. The AP may check the Enhanced Distributed Channel Access (EDCA) parameters of the packets in the flow to identify the access category. In an example, the AP may identify the access category of the packets in the flow as "QoS sensitive" and may categorize the flow as a bursty flow. Thus, based on the access category, the AP may determine the bursty flow. Flow of QoS sensitive traffic for real-time applications, such as VoIP, online gaming, etc., may be identified as bursty flows. In another example, the predefined application priority list containing a list of applications categorized as bursty applications may be stored in the AP. When the AP identifies a flow associated with the bursty applications, the flow is categorized as bursty flow. In some examples, the AP may identify the bursty flow by analyzing QoS information in the packet headers. Flow of network traffic having higher priority may be categorized as bursty flow. In another example, the AP may use Machine Learning (ML) models to observe the flows of different applications and buffering pattern of such applications. Based on the buffering patterns, the ML models may identify the bursty flows. Thus, the AP may monitor traffic flow information of each flow between the AP and the client device and may determine a set of bursty flows.

In response to determining that the flow is a bursty flow ('Yes' branch from block 310), the AP may increase a bursty flow count, at block 312. The bursty flow count may represent a total number of bursty flows in set. In an example, increasing the bursty flow count may include incrementing a value of a counter storing the bursty flow count.

In response to determining that the flow is not a bursty flow ('No' branch from block 310), the AP may check whether the flow is a Constant Bit Rate (CBR) flow at block 314. In an example, some applications, such as voice, fixed-rate video, and control and sensor signals may use CBR traffic. CBR may refer to a fixed rate of flow of packets from the source to the destination. In response to determining that the flow is transmitted to an application running in the client device at a specific CBR, the flow is identified as a CBR flow. The specific CBR may be expressed as packets per second and may be predefined by the administrator in the AP. Thus, the AP may monitor traffic flow information of each flow between the AP and the client device and may determine a set of CBR flows.

In response to determining that the flow is a CBR flow ('Yes' branch from block 314), the AP may increase a CBR flow count, at block 316. The CBR flow count may represent a total number of CBR flows in the set. In an example, increasing the CBR flow count may include incrementing a value of a counter storing the CBR flow count.

In an example, in response to determining that the flow is not a CBR flow ('No' branch from block 314), at block 318, the AP compares the bursty flow count with a bursty flow threshold. The bursty flow threshold represents a maximum number of bursty flows that can be processed by the AP simultaneously without adversely affecting the airtime fairness of client devices associated with the AP. Further, at block 318, the AP also compares the CBR flow count with a CBR flow threshold. The CBR flow threshold represents a maximum number of CBR flows that can be processed by the AP simultaneously without adversely affecting the airtime fairness of client devices associated with the AP. The bursty flow threshold and the CBR flow threshold may be predefined by the administrator in the AP.

In response to determining that the bursty flow count or the CBR flow count exceeds the bursty flow threshold or the CBR flow threshold, respectively, the AP may decrease burst duration for the bursty flows or CBR flows of the client device, at block 320. In an example, prior to decreasing the burst duration, the AP may check the channel occupancy of the operating channel of the AP. In response to determining that the channel occupancy of the operating channel of the AP is below the channel busy threshold, the AP may decrease the TXOP limit to decrease the burst duration.

In response to determining that the bursty flow count is less than or equal to the bursty flow threshold ('No' branch from block 318), the AP may perform another check to determine whether a bursty flowrate is greater than a bursty flowrate threshold, at block 322. The AP may determine the bursty flowrate as an average rate of flow of packets of each of the set of bursty flows over a specific time duration. The bursty flowrate threshold represents a predefined maximum number of packets that may be allowed to be transmitted per second for each of the set of bursty flows of the client device.

In response to determining that the CBR flow count is less than or equal to the CBR flow threshold ('No' branch from block 318), the AP may perform another check to determine whether a CBR flowrate is greater than a CBR flowrate threshold, at block 324. The AP may determine the CBR flowrate as an average rate of flow of packets of each of the set of CBR flows over the specific time duration. The CBR flowrate threshold represents a predefined maximum number of packets that may be allowed to be transmitted per second for each of the set of CBR flows of the client device.

In response to determining that the bursty flowrate is greater than the bursty flowrate threshold ("Yes" branch from block 322) or the CBR flowrate is greater than the CBR flowrate threshold ("Yes" branch from block 324), the AP may increase the burst duration for the bursty flows or CBR flows of the client device, at block 326. In an example, the AP may increase the burst duration by increasing the TXOP limit for the bursty flows or the CBR flows of the client device. In an example, prior to increasing the burst duration the AP may check the channel occupancy of the operating channel of the AP. In an example, in response to determining that the channel occupancy of the operating channel of the AP is below the channel busy threshold, the AP may increase the TXOP limit to increase the burst duration, Thus, as explained hereinabove, the AP may modify (increase or decrease) the burst duration for traffic flow between the AP and the client device based on the traffic flow information and may communicate with the client device using the channel for the modified burst duration.

Figure 4:
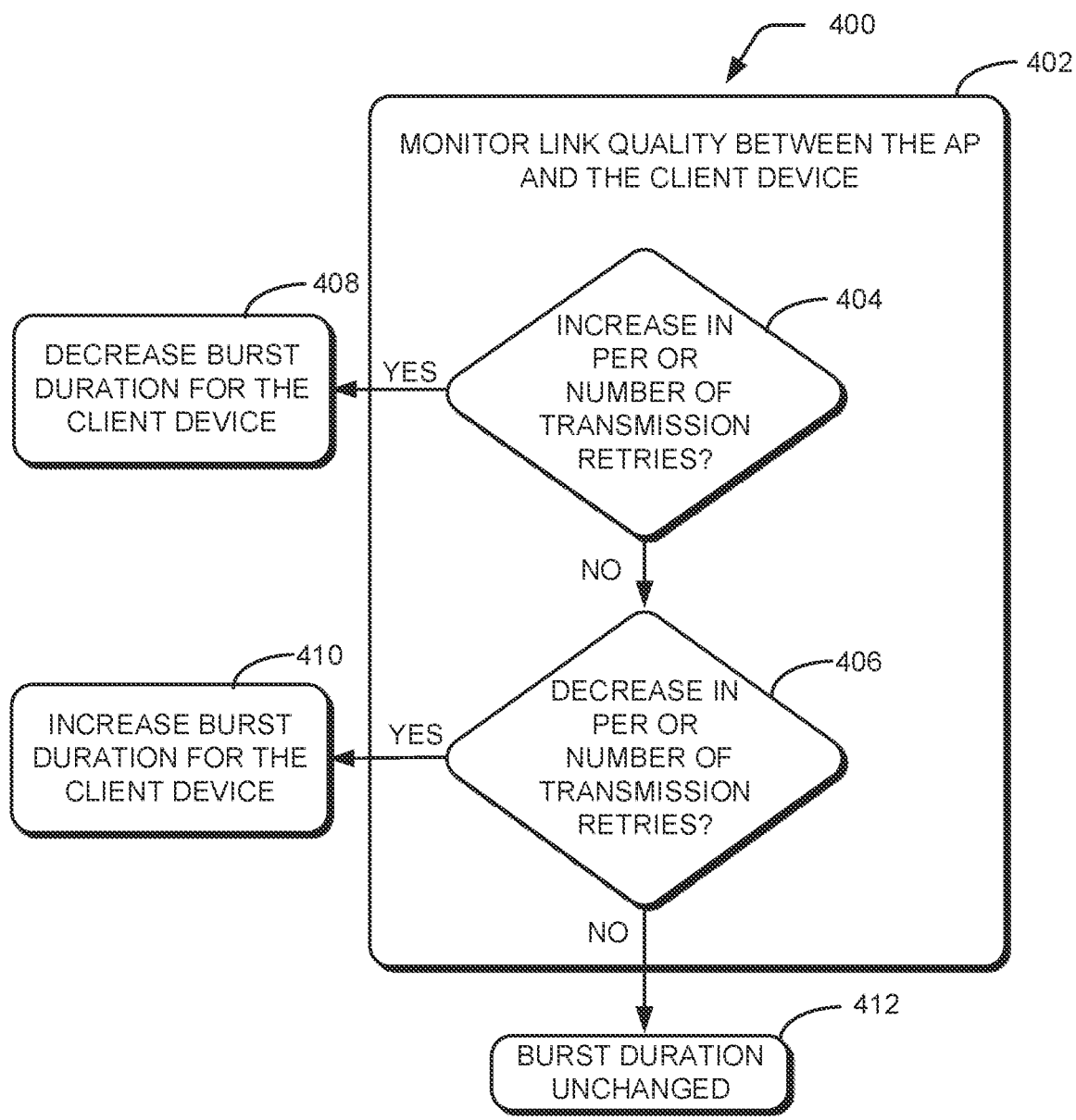
FIG. 4 illustrates another example method for modifying burst duration, in accordance with an embodiment.

In an example, in response to determining that the bursty flowrate is less than or equal to the bursty flowrate threshold ('No' branch from block 322) or the CBR flowrate is less than or equal to the CBR flowrate threshold ('No' branch from block 324), the burst duration may remain unchanged, at block 328, FIG. 4 illustrates another example method 400 for modifying the burst duration in accordance with an embodiment. The method 400 may be executed by a network device, such as an AP, In an example, operation(s) of the method 400 may be executed in parallel or in combination with operation(s) of the method 300 of FIG. 3.

Although in the examples described herein, it is considered that the method 400 is implemented by an AP, however, operations of the method 400 may also be implemented by client devices, such as personal computers, laptops, smartphones, etc. The method 400 can be implemented by processing resource(s) or computing device(s) through any suitable hardware, a non-transitory machine-readable medium, or combination thereof. In an example, the method 400 may be performed by executing computer-readable instructions, which include instructions stored on a medium and executable by a processing resource, such as the hardware processor 202, of a computing component, such as the computing component 200. Further, although the steps shown in FIG. 4 are in an order, the shown order is not the only order in which the steps may be performed. Any step may be performed in any order, at any time, may be performed repeatedly, and/or may be performed by any suitable device or devices.

Referring to FIG. 4, at block 402, the AP monitors the link quality between the AP and a client device. In some examples, in response to the client device associating with the AP, the AP may initiate monitoring the link quality. Performing block 402 may include performing operations at blocks 404 and 406.

At block 404, the AP may perform a check to determine whether a Packet Error Rate (PER) or a number of transmission retries have increased. In an example, the PER may be represented as a percentage of the ratio of a number of test packets not successfully received by the client device to the number of test packets sent to the client device by the AP. Transmission retries may represent a number of times the same packet is sent to the client device in order for the packet to be delivered successfully. An increase in the PER or the number of transmission retries may indicate an increased packet loss and poor link quality for the client device. Further, in an example, the AP may determine a decrease in an MCS index value of the client device, in response to the increase in the PER and the transmission retries. The decrease in the MCS index value may indicate that the link quality for the client device has deteriorated.

In response to determining that the PER has increased, or the transmission retries have increased ('Yes' branch from block 404), the AP may decrease the burst duration for the client device, at block 408. Decreasing the burst duration on the deterioration of the link quality may allow preventing increased traffic drops which may have occurred with longer burst transmissions despite poor link quality. In an example, prior to decreasing the burst duration at block 408, the AP may check the channel occupancy of the operating channel of the AP. In response to determining that the channel occupancy of the operating channel of the AP is below the channel busy threshold, the AP may decrease the TROP limit to decrease the burst duration.

In response to determining that the PER has not increased, or the transmission retries have not increased ('No' branch from block 404), the AP may perform another check to determine whether the PER has decreased, or the transmission retries have decreased, at block 406. In an example, the AP may monitor the PER and/or the transmission retries in a plurality of observation windows. The AP may monitor changes in the PER and/or the transmission retries over two successive observation windows to determine whether the PER or transmission retires have increased or decreased. A decrease in the PER or the number of transmission retries may indicate a decreased packet loss and improved link quality for the client device. Further, in an example, the AP may determine an increase in the MOS index value of the client device, in response to the decrease in the PER and the transmission retries. The increase in the MCS index value may indicate that the link quality for the client device has improved.

In response to determining that the PER or the transmission retries have decreased ('Yes' branch from block 406), the AP may increase the burst duration for the client device, at block 410. In an example, prior to increasing the burst duration at block 410, the AP may check the channel occupancy of the operating channel of the AP. In response to determining that the channel occupancy of the operating channel of the AP is below the channel busy threshold, the AP may increase the TROP limit to increase the burst duration. In an example, in response to determining that the PER or the transmission retries have not decreased ('No' branch from block 406), the burst duration may remain unchanged, at block 412. Thus, as explained hereinabove, the AP may modify (increase or decrease) the burst duration for traffic flow between the AP and the client device based on the link quality and may communicate with the client device using the channel for the modified burst duration.

FIG. 5A illustrates an example method 500 for modifying the burst duration in accordance with an embodiment. The method 500 may be executed by a network device, such as an AP. In an example, operation(s) of the method 500 may be executed in parallel or in combination with operation(s) of method 300 of FIG. 3 and/or method 400 of FIG. 4.

Figure 5:
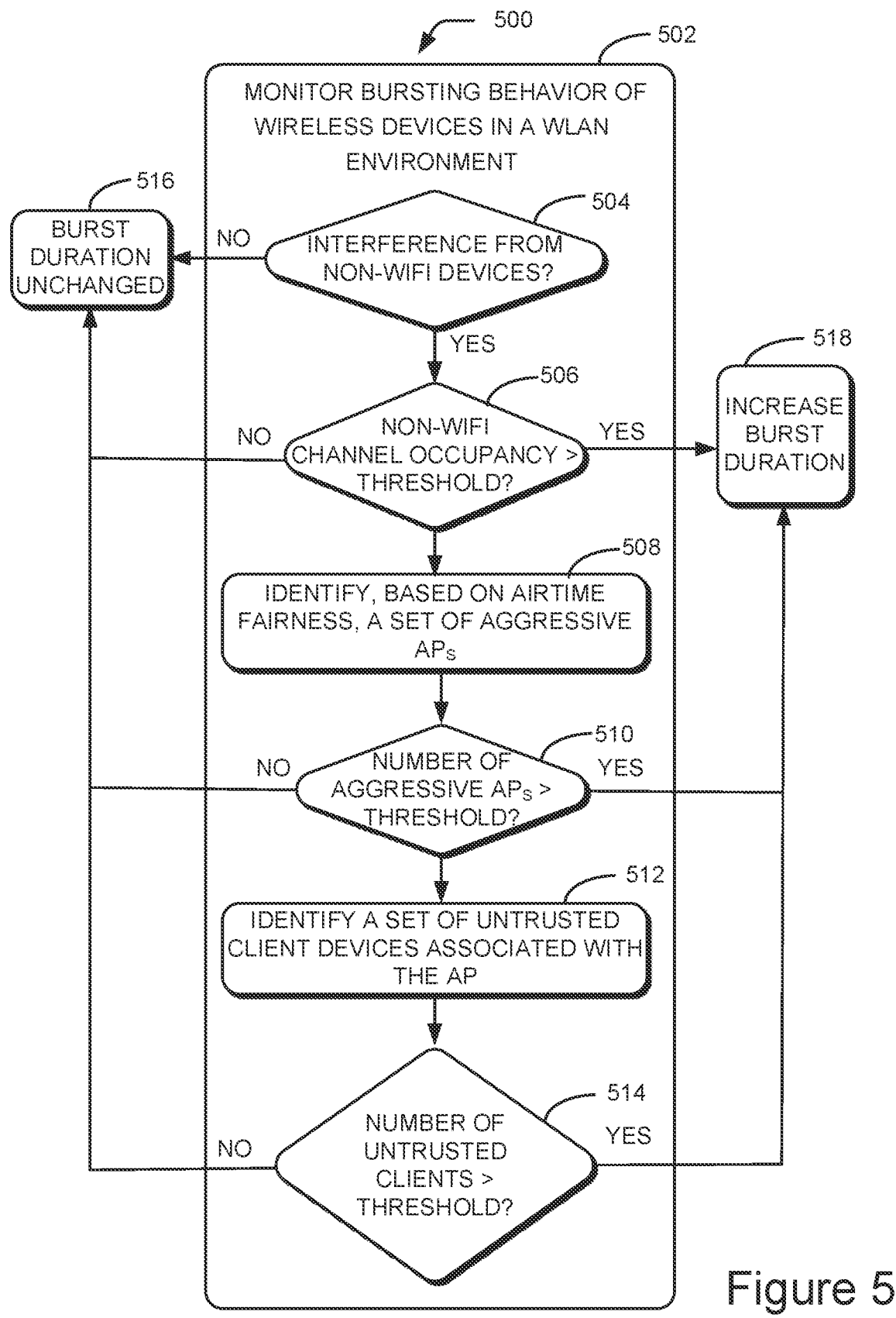
FIG. 5 illustrates yet another example method for modifying burst duration, in accordance with an embodiment.

Although in the examples described herein, it is considered that the method 500 is implemented by an AP, however, operations of the method 500 may also be implemented by client devices, such as personal computers, laptops, smartphones, etc. The method 500 can be implemented by processing resource(s) or computing device(s) through any suitable hardware, a non-transitory machine-readable medium, or combination thereof. In an example, the method 500 may be performed by executing computer-readable instructions, which include instructions stored on a medium and executable by a processing resource, such as the hardware processor 202, of a computing component, such as the computing component 200. Further, although the steps shown in FIG. 5 are in an order, the shown order is not the only order in which the steps may be performed. Any step may be performed in any order, at any time, may be performed repeatedly, and/or may be performed by any suitable device or devices.

Referring to FIG. 5, at block 502, the AP may monitor bursting behavior of wireless devices in a WLAN environment. In an example, the WLAN environment may include multiple ESS, each ESS including multiple BSS. An ESS may include multiple APs deployed by one or more different vendors and client devices connecting to those APs. The WLAN environment may also include non-Wi-Fi devices which may operate using RF signals. Examples of non-Wi-Fi devices may include wireless devices using License Assisted Access (LAA). Performing block 502 may include performing operations at blocks 504 to 514.

At block 504, the AP performs a check to determine whether there is interference in the operating channel of the AP from non-Wi-Fi devices. In an example, the non-Wi-Fi devices may include unlicensed devices using the wireless network, such as License Assisted Access (LAA) devices, Bluetooth gadgets, ZigBee units, various game controllers, analog phones, frequency hopping phones, etc. The AP may detect the presence of the interference from non-Wi-Fi devices in the operating channel using spectrum analysis. In an example, the AP may monitor variations in amplitude and/or RF power levels in the Wi-Fi spectrum to identify interference from the non-Wi-Fi devices.

In response to determining that interference from the non-Wi-Fi devices is present ('Yes' branch from block 504), the AP may determine a non-Wi-Fi channel occupancy. The non-Wi-Fi channel occupancy refers to an average time of detected transmissions of RF signals by non-Wi-Fi devices in the operating channel above a certain power level. The AP may determine the non-Wi-Fi channel occupancy based on Clear Channel Assessment (CCA). In response to determining that that interference from the non-Wi-Fi devices is absent ('No' branch from block 504), the burst duration may remain unchanged, at block 516.

At block 506, the AP performs a check to determine whether the non-Wi-Fi channel occupancy is greater than a non-Wi-Fi channel occupancy threshold. The non-Wi-Fi channel occupancy threshold may represent a maximum permissible limit of the non-Wi-Fi channel occupancy. The non-Wi-Fi channel occupancy threshold may be expressed in unit of time and may be predefined by an administrator based on a type of deployment. For example, with an increase in deployment density of APs in the MILAN environment, a lower value of the non-Wi-Fi channel occupancy threshold may be set by the administrator.

In response to determining that the non-Wi-Fi channel occupancy is greater than the non-Wi-Fi channel occupancy threshold ('YES' branch from block 506), the AP may increase the burst duration for the client device associated with the AP, at block 518, Thus, if the operating channel of the AP is utilized for non-Wi-Fi communications, the AP sets a high TXOP limit for the client device thereby promoting balanced use of the operating channel for Wi-Fi and non-Wi-Fi communications. In another example, in response to determining that the non-Wi-Fi channel occupancy is greater than the non-Wi-Fi channel occupancy threshold, the AP may increase the burst duration for all its associated client devices in the BSS. Thus, the AP safeguards the interests of its BSS in a scenario where non-Wi-Fi devices may consume the operating channel.

In an example, in response to determining that the non-Wi-Fi channel occupancy is less than or equal to the non-Wi-Fi channel occupancy threshold ('NO' branch from block 506), the AP may determine that the non-Wi-Fi devices allow fair access to the operating channel. In response to determining that the non-Wi-Fi devices allow fair access to the operating channel, the AP may allow burst durations of transmissions to all its associated client devices to remain unchanged, thereby promoting fairness in channel access in the BSS.

Further, at block 508, the AP may identify, based on airtime fairness, a set of aggressive APs in the ESS. In an example, the AP may analyze the airtime fairness for each client device associated with at least one AP from a plurality of APs in the ESS. If each of the client devices in the ESS has equal airtime regardless of client capability, then the AP determines that there are no aggressive APs in the ESS. However, if a client device associated with an AP has a greater airtime in comparison to other client devices in the ESS, such AP may be identified as an aggressive AP. In another example, the AP may detect packets received from another AP in the ESS using the same operating channel, based on the MAC address of the incoming packets. If the percentage of channel occupancy for the other AP is above a threshold, the AP may tag the other AP as an aggressive AP. The percentage of channel occupancy is calculated over a specific period of time. The threshold may be a function of number of neighbor APs, traffic queued for transmission at the AP, etc. Thus, a set of aggressive APs in the ESS may be identified.

At block 510, the AP may perform another check to determine whether the number of aggressive APs in the ESS is greater than an aggressive AP threshold. The aggressive AP threshold may correspond to a predefined allowable limit of aggressive APs in an ESS. The aggressive AP threshold may be set by an administrator based on data transmission rates of the APs in the ESS.

In response to determining that the number of aggressive APs in the ESS is greater than the aggressive AP threshold ('Yes' branch from block 510), the AP increases the burst duration for transmissions to all its associated client devices in the BSS, at block 518, In an example, prior to increasing the burst duration, the AP may check the channel occupancy of the operating channel of the AP. In an example, in response to determining that the channel occupancy of the operating channel of the AP is below the channel busy threshold, the AP may increase the TXOP limit to increase the burst duration. In response to determining that the number of aggressive APs in the ESS is less than or equal to the aggressive AP threshold ('No' branch from block 510), the burst duration may remain unchanged, at block 516.

Further, at block 512, the AP may identify a set of untrusted client devices associated with the AP. If a client device associated with the AP sends or receives burst transmissions for a duration higher than its TXOP limits, such a client device may be referred to as an untrusted client device. To identify an untrusted client device the AP may perform a check to determine whether a burst duration of a client device among the client devices in its BSS is greater than the TXOP limit defined in the EDCA parameters configured in the AP. If the client device has a burst duration higher than its TXOP limit, such client device is identified as an untrusted client device. Thus, the AP may identify the set of untrusted client devices in its BSS.

Further, at block 514, the AP may perform yet another check to determine whether a number of untrusted client devices in the BSS is more than an untrusted client threshold. The untrusted client threshold may correspond to a predefined number of untrusted client devices in a BSS which the AP can serve without adversely affecting airtime fairness in the BSS. The untrusted client threshold may be predefined by an administrator.

In response to determining that the number of untrusted client devices is more than the untrusted client threshold (Yes branch from block 514), the AP increases the burst duration for all client devices in the BSS, at block 518. Increasing the burst duration for all client devices in the BSS in presence of untrusted client devices, allows the AP to maintain better airtime fairness in the BSS. In response to determining that the number of client devices is equal to or less than the untrusted client threshold ('No' branch from block 514), the burst duration may be kept unchanged, at block 516. Thus, as explained hereinabove, the AP may modify (increase or decrease) the burst duration for traffic flow between the AP and the client device based on the bursting behavior and may communicate with the client device using the channel for the modified burst duration.

Figure 6:
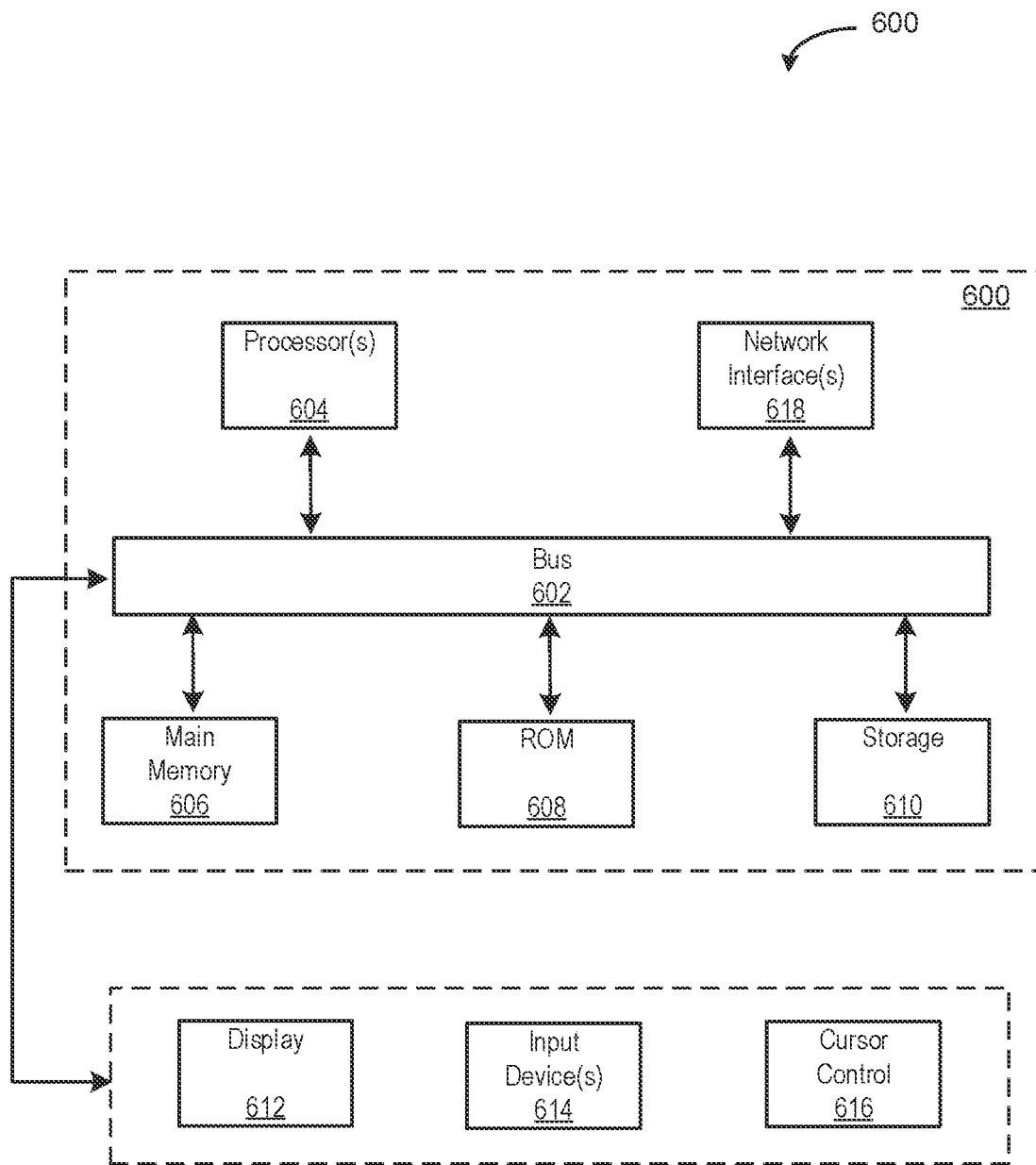
FIG. 6 depicts a block diagram of an example computer system in which the embodiments described herein may be implemented.

FIG. 6 depicts a block diagram of an example computer system 600 in which the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general-purpose microprocessors.

The computer system 600 also includes a main memory 606, such as a random-access memory (RAM), cache and/or other dynamic storage devices, coupled to bus 602 for storing information and instructions to be executed by processor 604. Main memory 606 also may be used for storing temporary variables or other intermediate information during execution of instructions by processor 604. Such instructions, when stored in storage media accessible to processor 604, render computer system 600 into a special-purpose machine that is customized to perform the operations specified in the instructions.

The computer system 600 further includes a read-only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a Graphical User Interface (GUI) that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may include connected logic units, such as gates and flip-flops, and/or programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618, In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure; and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine; but deployed across a number of machines.

Flows include groups of network traffic in a network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g., firewall), role-based limitations (e.g., only the marketing department has access to social media while on the enterprise network), or other routing preferences.

A packet may refer to any unit of data that can be conveyed over a network. A packet or control packet may also refer to a frame or data frame, a data unit, a protocol data unit, Bridge Protocol Data Unit (BPDU) and so forth. A network device forwards data (in packets) between a sender device and a recipient device (or multiple recipient devices) based on forwarding information. The forwarding information may include entries that map network addresses (e.g., MAC addresses or IP addresses) and/or ports to respective network paths toward the recipient device(s).

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shah not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shah not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described, Rather, the specific features and methods are disclosed and explained in the context of a few implementations for the present subject matter.

We claim:

1. A method comprising:
   monitoring, by an access point (AP), a link quality between the AP and a client device associated with the AP;
   determining, by the AP, a channel occupancy of a channel in which the AP is configured to operate;
   in response to determining that the channel occupancy is less than a channel busy threshold, modifying, by the AP, a burst duration for traffic flow between the AP and the client device based on the link quality; and
   communicating, by the AP, with the client device using the channel for the modified burst duration.

2. The method of claim 1, wherein monitoring the link quality comprises:
   monitoring a Packet Error Rate (PER) of the client device;
   monitoring a number of transmission retries to the client device;
   determining that a Modulation and Coding Scheme (MCS) index value of the client device is decreased, in response to an increase in the PER or the number of transmission retries; and
   determining that the MCS index value is increased, in response to a decrease in the PER or the number of transmission retries.

3. The method of claim 2, wherein modifying the burst duration comprises: increasing the burst duration, in response to determining that the MCS index value is increased; and decreasing the burst duration, in response to determining that the MCS index value is decrease.

4. The method of claim 1, further comprising:
   determining a set of bursty flows of the client device based on at least one of deep packet inspection or a predefined application priority list; and
   determining a set of Constant Bit Rate (CBR) flows of the client device based on a specific CBR;
   in response to determining that a bursty flowrate of each of the set of bursty flows of the client device is greater than a bursty flowrate threshold; increasing the burst duration for each of the set of bursty flows of the client device; and
   in response to determining that a CBR flowrate of each of the set of CBR flows of the client device is greater than a CBR flowrate threshold, increasing the burst duration for each of the set of CBR flows of the client device.

5. The method of claim 1, further comprising:
   detecting presence of interference in the channel arising from a set of non-Wi-Fi devices;
   determining a non-Wi-Fi channel occupancy for the set of non-Wi-Fi devices;
   analyzing airtime fairness for each of a plurality of client devices associated with at least one AP from a plurality of APs in an Extended Service Set (ESS) of the AP;
   identifying, based on the airtime fairness, a set of aggressive APs in the ESS; and
   identifying a set of untrusted client devices from the plurality of client devices, each having a burst duration greater than a transmission opportunity (TXOP) defined in the Enhanced Distributed Channel Access (EDCA) parameters of the AP; and
   increasing the burst duration, in response to determining that at least the non-Wi-Fi channel occupancy is greater than a non-Wi-Fi channel occupancy threshold, the set of aggressive APs is greater than an aggressive AP threshold, or the set of untrusted client devices is greater than an untrusted client threshold.

6. The method of claim 1, further comprising:
determining a type of a Virtual Access Point (VAP) to which the client device is associated; and
in response to determining that the type of the VAP is included in a no-burst list, decreasing the burst duration.

7. A method comprising:
monitoring, by an AP, a traffic flow information between the AP and a client device associated with the AP;
determining, by the AP, a channel occupancy of a channel in which the AP is configured to operate;
in response to determining that the channel occupancy is less than a channel busy threshold, modifying, by the AP, a burst duration for traffic flow between the AP and the client device based on the traffic flow information; and
communicating, by the AP; with the client device using the channel for the modified burst duration.

8. The method of claim 7, wherein monitoring the traffic flow information comprises:
determining a set of bursty flows of the client device based on at least one of deep packet inspection or a predefined application priority list; and
determining a set of CBR flows of the client device based on a specific CBR.

9. The method of claim 8, wherein modifying the burst duration comprises:
in response to determining that a bursty flowrate of each of the set of bursty flows is greater than a bursty flowrate threshold, increasing the burst duration for each of the set of bursty flows of the client device; and
in response to determining that a CBR flowrate of each of the set CBR flows is greater than a CBR flowrate threshold, increasing the burst duration for each of the set of CBR flows of the client device.

10. The method of claim 7, further comprising:
monitoring a PER of the client device;
monitoring a number of transmission retries to the client device;
determining that a Modulation and Coding Scheme (MCS) index value of the client device is decreased, in response to an increase in the PER or the number of transmission retries;
determining that the MCS index value is increased, in response to a decrease in the PER or the number of transmission retries;
increasing the burst duration, in response to determining that the MCS index value is increased; and
decreasing the burst duration, in response to determining that the MCS index value is decreased.

11. The method of claim 7, further comprising:
detecting presence of interference in the channel arising from a set of non-Wi-Fi devices;
determining a non-Wi-Fi channel occupancy for the set of non-Wi-Fi devices;
analyzing airtime fairness for each of a plurality of client devices associated with at least one AP from a plurality of APs in an ESS of the AP;
identifying, based on the airtime fairness, a set of aggressive APs in the ESS; and
identifying a set of untrusted client devices from the plurality of client devices, each having a burst duration greater than a transmission opportunity (TXOP) defined in the Enhanced Distributed Channel Access (EDCA) parameters of the AP; and
increasing the burst duration, in response to determining that at least the non-Wi-Fi channel occupancy is greater than a non-Wi-Fi channel occupancy threshold, the set of aggressive APs is greater than an aggressive AP threshold, or the set of untrusted client devices is greater than an untrusted client threshold.

12. The method of claim 7, further comprising:
determining a type of a Virtual Access Point (VAR) to which the client device is associated; and
in response to determining that the type of the VAP is included in a no-burst list, decreasing the burst duration.

13. The method of claim 7, wherein communicating with the client device comprises transmitting a plurality of physical layer protocol data unit (PPDUs) separated by a Short Interframe Space (SIFS) from each other to the client device.

14. A method comprising:
monitoring, by an AP from a plurality of APs in a WLAN environment, a bursting behavior of wireless devices in the WLAN environment;
determining, by the AP; a channel occupancy of a channel in which the AP is configured to communicate with a client device;
in response to determining that the channel occupancy is less than a channel busy threshold, modifying, by the AP and based on the bursting behavior, a burst duration for traffic flow from the AP to the client device; and
communicating, by the AP, with the client device using the channel for the modified burst duration.

15. The method of claim 14, wherein monitoring the bursting behaviour comprises:
detecting presence of interference in the channel arising from a set of non-Wi-Fi devices;
analyzing airtime fairness for client devices in an ESS;
identifying, based on the airtime fairness, a set of aggressive APs in the ESS; and
identifying a set of untrusted client devices in the WLAN environment, each having a burst duration greater than a TXOP defined in the EDCA parameters of the AP.

16. The method of claim 15, wherein modifying the burst duration comprises:
increasing the burst duration, in response to determining that at least the non-Wi-Fi channel occupancy is greater than a non-Wi-Fi channel occupancy threshold, the set of aggressive APs is greater than an aggressive AP threshold, or the set of untrusted client devices is greater than an untrusted client threshold.

17. The method of claim 14, further comprising:
determining a set of bursty flows of the client device based on at least one of deep packet inspection or a predefined application priority list; and
determining a set of CBR flows of the client device based on a specific CBR;
in response to determining that a bursty flowrate of each of the set of bursty flows is greater than a bursty flowrate threshold, increasing the burst duration for each of the set of bursty flows of the client device; and
in response to determining that a CBR flowrate of each of the set of CBR flows is greater than a CBR flowrate threshold, increasing the burst duration for each of the set of CBR flows of the client device.

18. The method of claim 14, further comprising:
monitoring a PER of the client device;
monitoring a number of transmission retries to the client device;
determining that an MCS index value of the client device is decreased, in response to an increase in the PER or the number of transmission retries;

determining that the MCS index value is increased, in response to a decrease in the PER or the number of transmission retries;
increasing the burst duration; in response to determining that the MCS index value is increased; and
decreasing the burst duration, in response to determining that the MCS index value is decreased.

19. The method of claim 14, further comprising:
determining a type of a Virtual Access Point (VAR) to which the client device is associated; and
in response to determining that the type of the VAP is included in a no-burst list, decreasing the burst duration.

20. The method of claim 14, wherein communicating with the client device comprises transmitting a plurality of physical layer protocol data unit (PPDUs) separated by a Short Interframe Space (SIFS) from each other to the client device.

\* \* \* \* \*